United States Patent
Harutunian et al.

(10) Patent No.: US 7,752,603 B2
(45) Date of Patent: Jul. 6, 2010

(54) SYSTEMS AND METHODS FOR DATA INTERCHANGE AMONG AUTONOMOUS PROCESSING ENTITIES

(75) Inventors: Henric Harutunian, Clarksville, MD (US); Kaveh Parsee, Lanham, MD (US); Mehdi Tehranchi, Potomac, MD (US)

(73) Assignee: Notable Solutions, Inc., Rockville, MD (US)

( * ) Notice: Subject to any disclaimer, the term of this patent is extended or adjusted under 35 U.S.C. 154(b) by 1609 days.

(21) Appl. No.: 11/006,574

(22) Filed: Dec. 8, 2004

(65) Prior Publication Data

US 2005/0204282 A1  Sep. 15, 2005

Related U.S. Application Data

(60) Provisional application No. 60/527,297, filed on Dec. 8, 2003.

(51) Int. Cl.
  *G06F 9/45* (2006.01)
  *G06F 9/445* (2006.01)
  *G06F 3/00* (2006.01)

(52) U.S. Cl. .................. 717/121; 717/108; 717/118; 717/165; 719/319; 719/329; 719/332

(58) Field of Classification Search .................. None
See application file for complete search history.

(56) References Cited

U.S. PATENT DOCUMENTS

| 5,603,034 | A | * | 2/1997 | Swanson ................... 717/111 |
| 6,151,567 | A | | 11/2000 | Ames et al. |
| 6,564,248 | B1 | | 5/2003 | Budge et al. |
| 6,567,122 | B1 | | 5/2003 | Anderson et al. |
| 6,601,071 | B1 | * | 7/2003 | Bowker et al. ............... 707/102 |
| 6,934,740 | B1 | * | 8/2005 | Lawande et al. ............ 709/213 |
| 2002/0198888 | A1 | | 12/2002 | Young |
| 2003/0063072 | A1 | | 4/2003 | Brandenberg et al. |
| 2003/0187854 | A1 | * | 10/2003 | Fairweather .................. 707/10 |
| 2004/0215797 | A1 | * | 10/2004 | Hadley ........................ 709/230 |
| 2005/0150944 | A1 | * | 7/2005 | Melick et al. ................ 235/375 |
| 2006/0282452 | A1 | * | 12/2006 | Takagi et al. ................. 707/101 |

OTHER PUBLICATIONS

International Search Report and Written Opinion (dated Jan. 11, 2006).

* cited by examiner

*Primary Examiner*—Tuan Q Dam
*Assistant Examiner*—Isaac T Tecklu
(74) *Attorney, Agent, or Firm*—Pillsbury Winthrop Shaw Pittman LLP

(57) ABSTRACT

Data element values are shared between a first software component and a second software component of a document processing framework. The components can capture, process, or route a digital image of a document and access a configuration file that is generated for the image. A data element attribute and value pair is placed in the configuration file. The value of the data element is a tag that includes an identifier identifying the first software component and a tag name. The first software component is executed on the image, produces a tag value corresponding to the tag name, searches the configuration file for the tag by the identifier, replaces the tag with the tag value in the configuration file, and terminates. The second software component is executed on the image after the first software component has terminated and reads the data element attribute and value pair.

46 Claims, 6 Drawing Sheets

SYSTEMS AND METHODS FOR DATA INTERCHANGE AMONG AUTONOMOUS PROCESSING ENTITIES

CROSS-REFERENCE TO RELATED APPLICATION

This application claims the benefit of U.S. Provisional Patent Application Ser. No. 60/527,297 filed Dec. 8, 2003, which is herein incorporated by reference in its entirety.

BACKGROUND OF THE INVENTION

1. Field of the Invention

Embodiments of the present invention relate to systems and methods of sharing data among autonomous processing entities under a common framework. More particularly, embodiments of the present invention relate to systems and methods for specifying shared data in an software application as a replaceable tag that is replaced at runtime by another software application.

2. Background Information

Sharing data among software applications is a common problem. Numerous solutions to this problem exist. One solution is an application programming interface (API). An API of a first application allows a second application to access its data via a defined set of routines, which the second application can call. An API can be a very efficient method of sharing data, especially for large and complex applications. Considerable effort, however, is required to develop and learn an API. As a result, it is less efficient method for large numbers of smaller applications.

Another method of sharing data is messaging. In this method, one application sends data to another application in the form of a message. The format of the message is understood by both applications. Messaging is advantageous for large numbers of autonomous applications, because only one format, or set of rules, needs to be understood by all applications. Messaging, however, becomes very complex when large numbers of applications share data. Message contention, is one of the many problems that arise in this instance.

Other methods of sharing data among software applications include but are not limited to Software Development Kit (SDK) integration, communication through a central repository, and file sharing. All methods of sharing data have advantages and disadvantages for particular types of applications.

Software applications that share simple information are a particularly hard problem. Simple information is, for example, a name or telephone number. It is usually a single piece of data. Most methods for sharing data among these applications are time consuming, manually intensive, and require an intense knowledge of a programming interface.

In view of the foregoing, it can be appreciated that a substantial need exists for systems and methods that can advantageously provide for data sharing among autonomous software applications that share simple information.

BRIEF SUMMARY OF THE INVENTION

One embodiment of the present invention is a system for sharing data element values among software components of a document processing framework that capture, process, and route a digital image of a document. The system includes a configuration file, a first software component, and a second software component. The configuration file is generated for the digital image and is used to store the data element values of the software components. The configuration file is accessible to the first software component and the second software component. At least one data element attribute and value pair is placed in the configuration file to be read by the second software component. The value of the data element is a tag that includes a start tag delimiter, an identifier identifying the first software component, an identifier and tag name separator, a tag name, and an end tag delimiter. The first software component is executed on the digital image, produces a tag value corresponding to the tag name, searches the configuration file for the tag by the identifier, replaces the tag with the tag value in the configuration file, and terminates. The second software component is executed on the digital image after the first software component has terminated and reads the at least one data element attribute and value pair, which includes the tag value.

Another embodiment of the present invention is a method for sharing data element values among software components of a document processing framework that capture, process, and route a digital image of a document. A configuration file corresponding to the digital image is created. A first software component of the document processing framework to be executed on the digital image is selected. A second software component of the document processing framework to be executed on the digital image is selected. The second software component is selected to be executed sequentially after the first software component. At least one data element attribute and value pair is placed in the configuration file to be read by the second software component. The value of the data element is a tag that includes a start tag delimiter, an identifier identifying the first software component, an identifier and tag name separator, a tag name, and an end tag delimiter. The first software component is executed on the digital image. The first software component produces a tag value corresponding to the tag name. The first software component searches the configuration file for the tag by the identifier. The first software component replaces the tag with the tag value in the configuration file and terminates. The second software component is executed on the digital image. The second software component reads the at least one data element attribute and value pair including the tag value.

Another embodiment of the present invention is a system for sharing information among autonomous processing entities that manipulate an instance of digital content. The system includes a shared memory space corresponding to the instance, a first autonomous processing entity, and a second autonomous processing entity. At least one attribute and value pair is placed in the shared memory to be read by the second autonomous processing entity. The value of the at least one attribute and value pair is a tag that includes an identifier identifying the first autonomous processing entity and a tag name. The first autonomous processing entity is executed on the instance, produces a tag value corresponding to the tag name, searches the shared memory space for the tag by the identifier, replaces the tag with the tag value in the shared memory, and terminates. The second autonomous processing entity is executed on the instance after the first autonomous processing entity has terminated and reads the at least one attribute and value pair. The value of the at least one attribute and value pair includes the tag value.

Another embodiment of the present invention is a method for sharing information among autonomous processing entities that manipulate an instance of digital content. A shared memory space corresponding to the instance is allocated. A first autonomous processing entity to be executed on the instance is selected. A second autonomous processing entity to be executed on the instance is selected. The second autonomous processing entity is executed sequentially after the first autonomous processing entity. At least one attribute and value pair is placed in the shared memory to be read by the second autonomous processing entity. The value of the at least one attribute and value pair is a tag including an identifier identifying the first autonomous processing entity and a tag name. The first autonomous processing entity is executed on the instance. The first autonomous processing entity produces a tag value corresponding to the tag name. The first autonomous processing entity searches the shared memory space for the tag by the identifier. The first autonomous processing entity replaces the tag with the tag value in the shared memory and terminates. The second autonomous processing entity is executed on the instance. The second autonomous processing entity reads the at least one attribute and value pair. The value of the at least one attribute and value pair includes the tag value.

Figure 1:
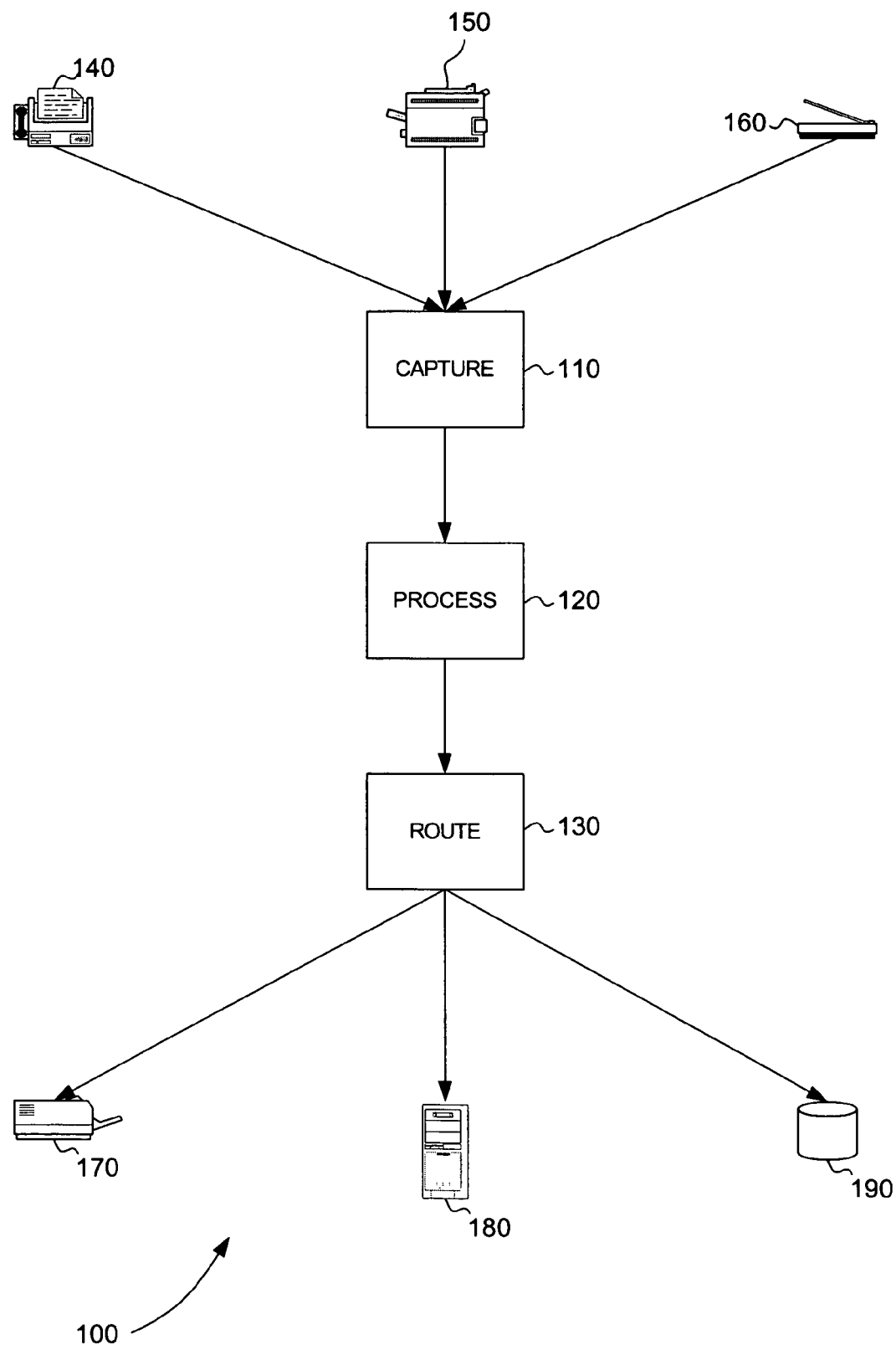
FIG. 1 is a schematic diagram showing an exemplary system for capturing, processing, and routing digital content, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Capture, Process, and Route

FIG. 1 is a schematic diagram showing an exemplary system 100 for capturing, processing, and routing digital content, in accordance with an embodiment of the present invention. System 100 includes three steps in an exemplary implementation of the invention. In capture step 110, data, images, and other types of files are read into system 100. Files can be read from devices including but limited to digital cameras, digital audio recorders, digital video recorders, digital audio players, digital video players, faxes, multifunctional peripherals, scanners, printers, computers, point of sale machines, and automated teller machines. Files can also be read from software applications including but limited to mail servers, address book managers, and databases. In process step 120, information is extracted from the files that are read, and this information is converted or manipulated. In route step 130, the information extracted, converted, or manipulated in process step 120 is transported to its final destination. The final destination of this information can be a device including but not limited to a computer, a printer, a fax, or a multifunctional device. The final destination can also be a software application including but not limited to a document management system, a file system, or a database.

Each step of system 100 includes of one or more independent software components. For example, FIG. 1 shows data being read from fax 140, multifunctional peripheral 150, and scanner 160 in capture step 110. In order to read data from all three devices, system 100 includes at least three independent capture software components. Independent software components can also be required for specific device manufacturers and specific device models. Similarly, independent software components are need for interfaces to software applications. FIG. 1 shows data being routed to printer 170, computer 180, and database application 190 in routing step 130. In order to route data to these two devices and one software application, routing step 130 requires at least three independent software components.

Exemplary capture software components include but are not limited to a digital sender reader, an address book manager exporter, an extensible markup language (XML) reader, a Hewlett-Packard™ multifunctional peripheral 4100 and 9000 interface, a Hewlett-Packard LaserJet™ multifunctional peripheral 9055 and 9065 interface, a poll directory software component, a content management queue software component, a batch importer, a post office protocol 3 (POP3) email importer, and a Hewlett-Packard™ Digital Sender 9100c application extractor.

A digital sender reader component decrypts header page files and image files, reads and processes header page files, and maps digital sender soft keys to a process component's attributes. An address book manager exporter exports entries from a device address book to a file. An XML reader reads XML files, encapsulated images, encapsulated index files, and files with XML schema. A Hewlett-Packard™ multifunctional peripheral 4100 and 9000 interface is designed to read data from Hewlett-Packard™ model 4100 and 9000 Chay .JAR menu enabled Hewlett-Packard™ devices and communicates with these devices by using XML to create and update application function keys, by receiving scanned document and indexing data, and by providing simple mail transfer protocol (SMTP) gateway functionality. A Hewlett-Packard™ multifunctional peripheral 9055 and 9065 interface is designed to read data from Hewlett-Packard™ model 9055 and 9065 Chay .JAR menu enabled Hewlett-Packard™ devices and communicates with these devices by using XML to create and update application function keys, by receiving scanned document and indexing data, and by providing simple mail transfer protocol (SMTP) gateway functionality.

A poll directory software component allows files to be batch loaded. The poll directory software component, imports documents of any format from any shared network drive, processes the content, and stores the content in a supported document within a database management system. The poll directory software component is designed to poll a input directory for files and then move all of the files from the input directory to the working directory before introducing them into the remainder of the process. A content management queue software component reads files from a variety of sources including multifunction peripherals, digital copiers, and fax servers. The content management queue software component performs post-capture functions including indexing and validation, document conversion, and document form recognition. The content management queue software component utilizes open database connectivity (ODBC) for storing and retrieving document from queues.

A batch importer reads and imports American standard code for information interchange (ASCII) delimited files for processing. The imported index fields can also contain one or more file path names for importing associated image files. The batch importer defines the delimiter, field orders, field names, and the image file field designation. The batch importer can import ASCII delimited index files, import one or multiple image files, and replace field values. A POP3 email importer retrieves email messages from a mail server that supports the POP3 protocol, including any attachments from the designated mailbox. The content of each email message can be either text or hypertext markup language (HTML). The content of each email message, including any attachments, is retrieved and processed as a single job, and the email message is, in turn, removed from the designated mailbox. The POP3 email importer must be supplied with a POP3 account name and its associated password for any specific email. A Hewlett-Packard™ Digital Sender 9100c application extractor extracts field definitions from the Microsoft SharePoint™ Portal Server Version 1.0 and automatically creates the matching profile definitions in the digital sender device. The Hewlett-Packard™ Digital Sender 9100c application extractor is designed to synchronize the digital sender application function keys with Microsoft SharePoint™ document profiles. The Hewlett-Packard™ Digital Sender 9100c application extractor creates a batch file that is used for loading function key definitions into the Hewlett-Packard™ Digital Sender 9100c.

Exemplary process components include but are not limited to an XML processing software component, an optical character recognition (OCR) software component, a basic image management utility, an encryption and decryption software component, a portable datafile (PDF) barcode reader, a file options utility, a notification software component, a professional image management utility, an ODBC interface, a data interchange software component, a watermark creation software component, and a Visual Basic™ and Java™ scripting software component.

An XML processing software component unpacks an XML document and determines whether or not to send the field values of the XML document to the next component in the process. An OCR software component provides font-independent character recognition on an image file. A basic image management utility cleans up black-and-white multi-page images, splits an image into multiple pages, and provides barcode recognition. An encryption and decryption software component allows captured data to be encrypted or decrypted. All encrypted files are appended with the cryptography (CRY) file extension. A PDF 417 barcode reader reads two dimensional barcodes from image files. After a barcode has been read, other components can use the barcode information within system 100. A file options utility captures processed files into a directory for rerouting to multiple destinations. The file options utility is useful in eliminating expensive and repetitive processor intensive tasks. The file options utility can determine how to treat a variety of files, depending on whether or not the files have been successfully captured.

A notification software component alerts a user to the status of a job. A job is the processing of a single instance of digital content in system 100. Job status can be a success or failure. The notification software component can be configured to send email messages, with or without attachments, about the job status. The notification software component uses SMTP for sending email. A professional image management utility is used to enhance the quality and appearance of black-and-white images. The professional image management utility enhances scanned or faxed documents by performing operations that remove imperfections. The professional image management utility can also split images into several documents based on a predefined set of criteria. The professional image management utility provides image-processing options including de-skew, de-speckle, smooth text, trim edges, remove dots, remove lines, remove borders, and remove empty pages.

An ODBC interface allows images, files, or data to be written directly into database tables of database applications including but not limited to Microsoft Access™ or Visual Fox Pro™. The ODBC interface can update structured query language (SQL) tables with images and data elements, or to create an archival system. A data interchange software component enables data to be interchanged among components when no mapping components are present within system 100. A watermark creation software component allows documents to be permanently watermarked with images, such as company logos, or text, such as "Confidential" and "Do Not Copy." A Visual Basic™ and Java™ scripting software component allows a user to build a custom-built capture software component. The Visual Basic™ and Java™ scripting software component also allows a user to write scripts to gain access to external databases, manipulate internal files, or validate indexing data fields.

Exemplary route software components include but are not limited to a send to fax software component, a send to a directory software component, a send to printer software component, a Microsoft SharePoint™ Portal Server interface, an interface to enterprise content management software, an ODBC interface, and an interface to a relational database.

A send to fax software component routes processed digital content to a fax. A send to a directory or folder software component routes processed processed digital content to a location in a file system. A send to printer software component routes processed processed digital content to a printer. A Microsoft SharePoint™ Portal Server interface is used to store files in the Microsoft SharePoint™ Portal Server. The Microsoft SharePoint™ Portal Server is a centralized, unified repository for enterprise users, which provides highly flexible deployment options. An interface to enterprise content management software routes processed digital content to enterprise content management software applications. An ODBC interface routes processed digital content to any ODBC compliant database. An interface to a relational database routes processed digital content to a specific relational database.

A large number of capture, process, and route software components are required for a system that supports a significant number of devices and software applications. As the number of software components increases, so does the need for systems and methods for sharing data elements among software components.

Data Sharing Among Capture Process, and Route Components

Figure 2:
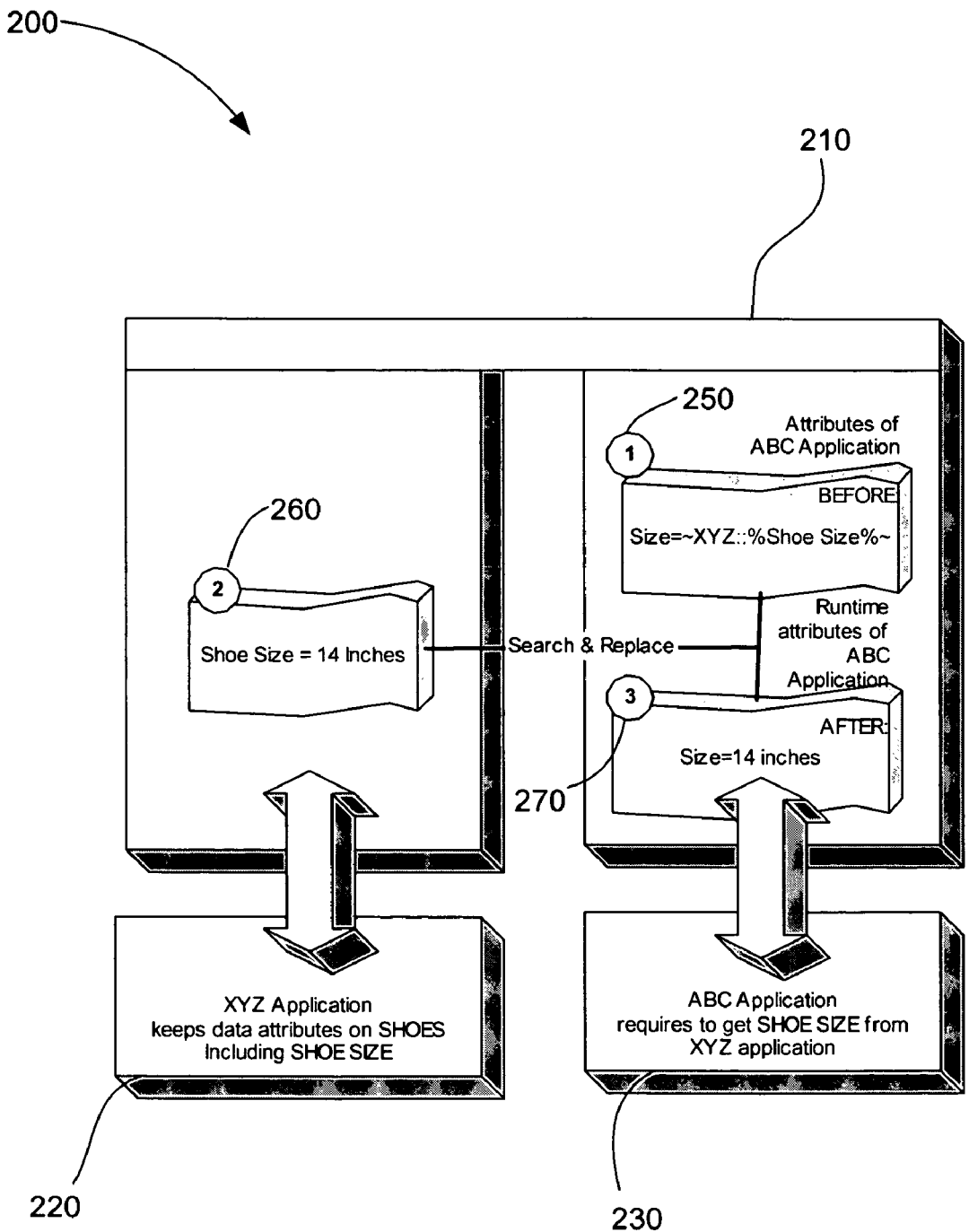
FIG. 2 is a schematic diagram showing an exemplary system for sharing data element values among components of a document processing framework that capture, process, and route a digital image of a document, in accordance with an embodiment of the present invention.

FIG. 2 is a schematic diagram showing an exemplary system 200 for sharing data element values among components of a document processing framework that capture, process, and route a digital image of a document, in accordance with an embodiment of the present invention. System 200 includes configuration file 210, XYZ application 220, and ABC application 230. XYZ application 220 and ABC application 230 are independent software components. XYZ application 220 and ABC application 230 operate under the same document processing framework, however. Under this framework, software components have equal access to configuration file 210, are executed on the same digital image of a document, and are executed sequentially in a pipeline fashion.

XYZ application 220 is, for example, a character recognition application that reads the shoe size from a sales receipt that is scanned into system 200. ABC application 230 is, for example, an interface to an inventory control program. ABC application 230 adds the shoe size of shoes sold to an inventory control program by obtaining the shoe size from XYZ application 220.

For example, in system 200 data element values are shared between XYZ application 220 and ABC application 230 using runtime replacement tags (RRTs). RRTs are tags placed within configuration file 210 for replacement by data element values during execution time. FIG. 2 shows how data element values are shared using RRTs by displaying the contents of configuration file 210 over time. At time 250, a data element attribute "Size" and value "~XYZ::%Shoe Size%~" are placed in configuration file 210. This attribute and value pair is placed in configuration file 210 at the time the software components to be executed are selected, for example. The value of the attribute "Size" at time 250 is an RRT. The RRT includes a start tag delimiter, an identifier identifying the software component that will replace the RTT, an identifier and tag name separator, a tag name, and an end tag delimiter. The start tag delimiter is a tilde, '~', character. The identifier is a three character identifier, "XYZ", of XYZ application 220. The identifier and tag name separator is a string of two colons, "::." The tag name is "%Shoe Size%." Finally, the end tag delimiter is also a tilde, '~', character.

The purpose of the RRT placed in configuration file 210 at time 250 is to share a data element between XYZ application 220 and ABC application 230. At time 250, it is known that ABC application 230 will read a value for the attribute "Size", that XYZ application 220 will be executed before ABC application 230, and that a value for the attribute "Size" can be obtained from the attribute "Shoe Size" used or generated by application XYZ 220.

At time 260, XYZ application 220 is executed, for example, on a digital image of a bar code that contains a shoe size of fourteen inches. XYZ application 220 uses character recognition to recognize the shoe size and places the attribute value pair "Shoe Size=14 inches" in configuration file 210. Before XYZ application 220 terminates, it searches configuration file 210 for any RTTs containing its "XYZ" identifier. XYZ application 220 find the RRT "~XYZ::%Shoe Size%~" by the identifier "XYZ". XYZ application 220 attempts to replace the tag name "%Shoe Size%." The percent, '%', characters on either side of the tag name identify the tag name as a field tag name. XYZ application 220 searches its attributes in configuration file 210 for the "Shoe Size" attribute. From the "Shoe Size" attribute, XYZ application 220 obtains the tag value "14 inches."

At time 270, XYZ application 220 replaces the RRT "~XYZ::%Shoe Size%~" with the tag value "14 inches" in configuration file 210. To complete the data sharing between XYZ application 220 and ABC application 230, ABC application 230 reads its attribute "Size" and obtains the value "14 inches." In one embodiment of the present invention, the attributes of a software component are located by name. In another embodiment of the present invention, the attributes of a software component are found by searching a specific section of the configuration file.

Figure 3:
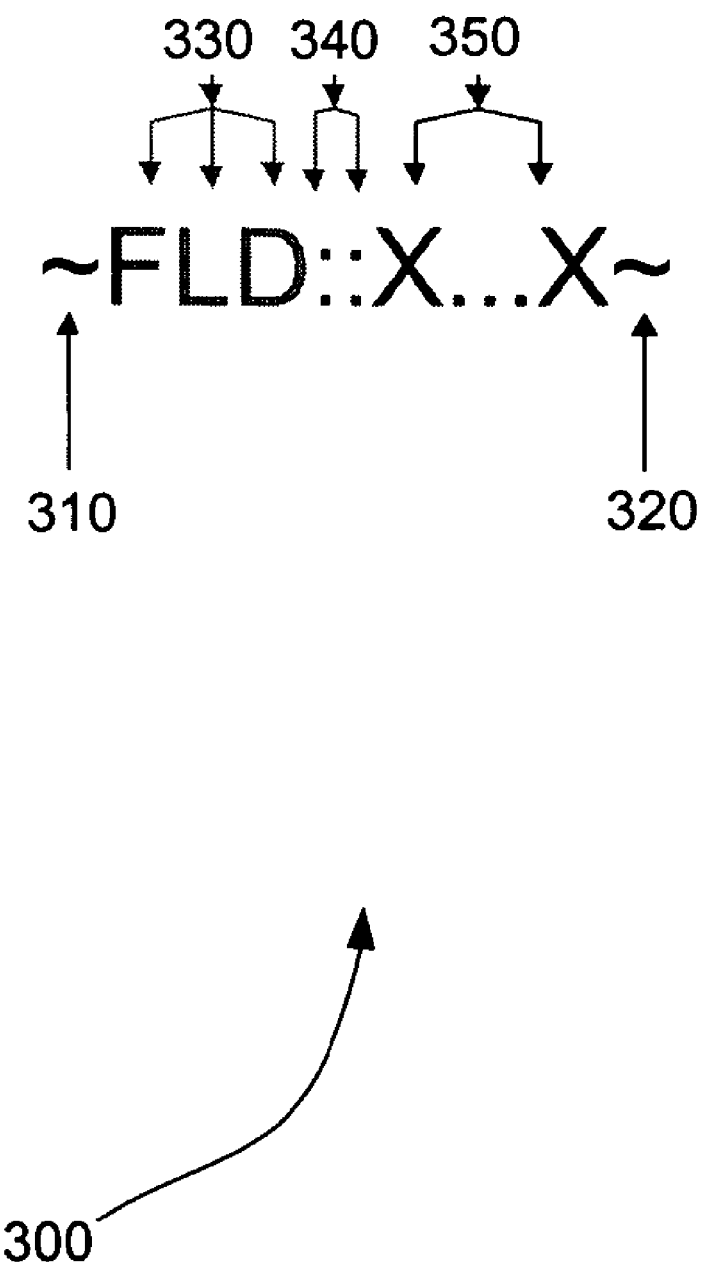
FIG. 3 is an illustration of an exemplary runtime replacement tag definition, in accordance with an embodiment of the present invention.

FIG. 3 is an illustration of an exemplary RRT definition 300, in accordance with an embodiment of the present invention. RRTs are preferably case sensitive. Character spaces cannot be introduced between RRT segments. Special characters are preferably used to mark the beginning and ending of each RRT. For example, start tag delimiter 310 can be a tilde character. End tag delimiter 320 can similarly be a tilde character. Identifier 330 preferably includes three characters that identify the software component owning the RRT and responsible for replacing the RRT with an actual value. Separator 340 is used to separate identifier 330 from replacement tag name 350. Separator 340 is preferably a double colon, "::", string. Separator 340 is a reserved string and cannot be used in the other parts of the RRT. Replacement tag name 350 is the name of data elements or metadata collected from a content source or generated by a software component itself.

There are at least three types of replacement tag names. A first type of replacement tag name is a reserved replacement tag name. Each software component is allowed to create and maintain a set of reserved replacement tag names. Within the boundaries of each software component reserved replacement tag names have special meaning. Each software component defines a list of reserved replacement tag names.

A second type of replacement tag name is a field replacement tag name. Software components that support field names allow the fields to be referenced using a special enclosure character, "%", on either side of the replacement tag name. An example field name used within an RRT is shown in FIG. 2. In this example, the field replacement tag name is "%Shoe Size%" and the field name is "Shoe Size."

A third type of replacement tag name is a special set replacement tag name. Special set replacement tag names are special sets of characters that provide useful information on a job, including but not limited to a document date and a document creation time. For example, the RRT "~M49::%Y~ contains the special set replacement tag name "%Y", which causes the software component "M49" to replace the RRT with a year of creation of a document, or "2004." Not all software components support special set replacement tag names.

The RRT shown in FIG. 3 is a static RRT. The RRT contains a static replacement tag name that is used to locate a value to replace the RRT. An RRT can also be active. In another embodiment of the present invention, an active RRT contains an executable script in the replacement tag name area of the RRT rather than the replacement tag name. A software component identified by the identifier of an active RRT executes the executable script to produce a tag value that replaces the active RRT.

An executable script of an active RRT can include but is not limited to variables, variable assignments, conditional statements, loops, conditional loops, functions, operators, arithmetic operators, input functions, and output functions. The syntax used by an executable script of an active RRT is preferably the syntax of a known programming scripting language. Known programming scripting languages include but are not limited to Visual Basic™ and Java™.

Figure 4:
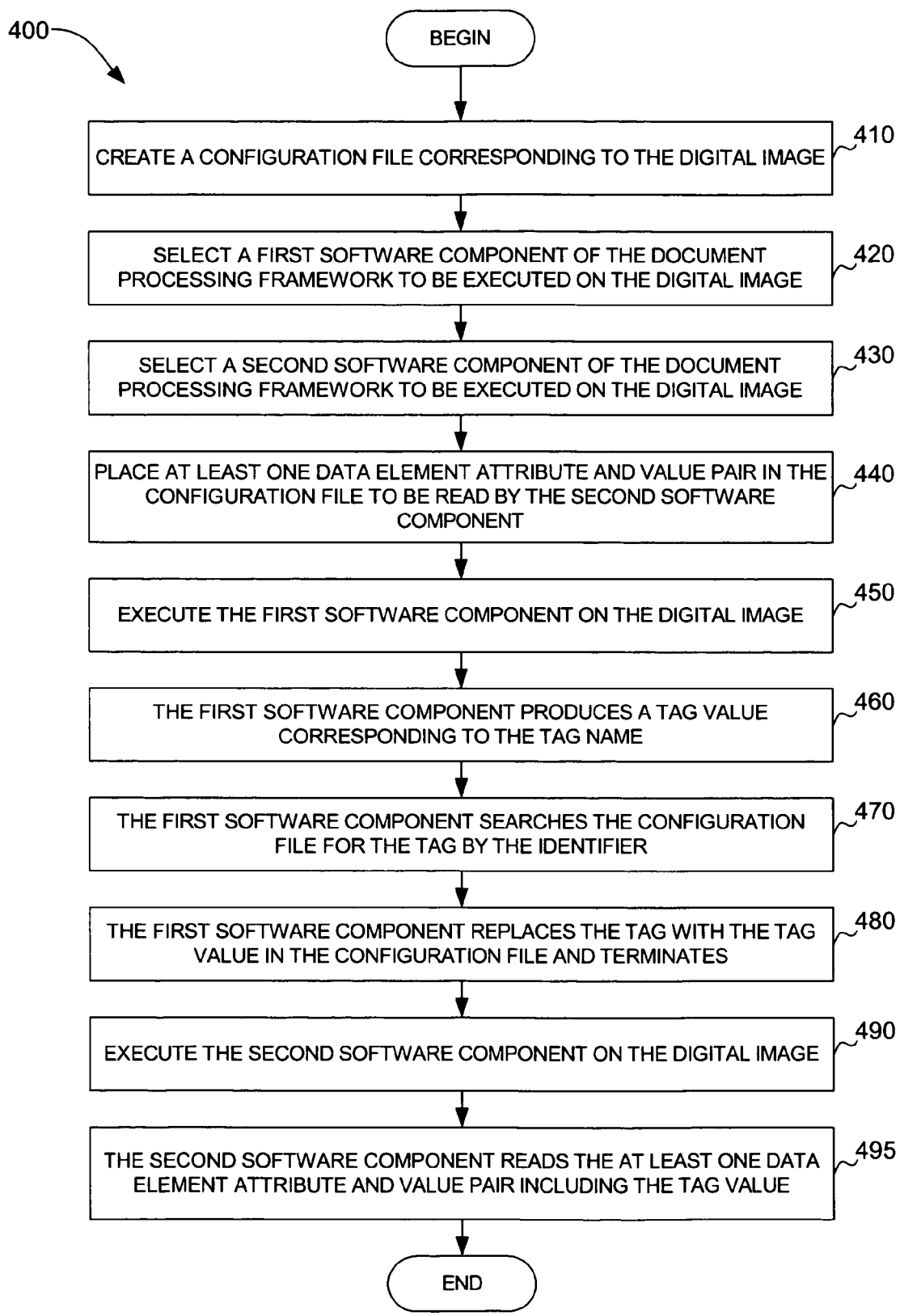
FIG. 4 is a flowchart showing an exemplary method for sharing data element values among components of a document processing framework that capture, process, and route a digital image of a document, in accordance with an embodiment of the present invention.

FIG. 4 is a flowchart showing an exemplary method 400 for sharing data element values among components of a document processing framework that capture, process, and route a digital image of a document, in accordance with an embodiment of the present invention.

In step 410 of method 400, a configuration file corresponding to the digital image is created.

In step 420, a first software component of the document processing framework to be executed on the digital image is selected.

In step 430, a second software component of the document processing framework to be executed on the digital image is selected. The second software component is selected to be executed sequentially after the first software component.

In step 440, at least one data element attribute and value pair is placed in the configuration file to be read by the second software component. The value of the data element is a tag that includes a start tag delimiter, an identifier identifying the first software component, an identifier and tag name separator, a tag name, and an end tag delimiter.

In step 450, the first software component is executed on the digital image.

In step 460, the first software component produces a tag value corresponding to the tag name.

In step 470, the first software component searches the configuration file for the tag by the identifier.

In step 480, the first software component replaces the tag with the tag value in the configuration file and terminates.

In step 490, the second software component is executed on the digital image.

In step 495, the second software component reads the at least one data element attribute and value pair including the tag value.

In another embodiment of method 400, at least one data element attribute and value pair is placed in the configuration file to be read by the second software component. The value of the data element is an active tag that includes a start tag delimiter, an identifier identifying the first software component, an identifier and executable script separator, an executable script, and an end tag delimiter. The first software component is executed on the digital image. The first software component searches the configuration file for the tag by the identifier. The first software component executes the executable script to produce a tag value. The first software component replaces the tag with the tag value in the configuration file and terminates. The second software component is executed on the digital image. The second software component reads the at least one data element attribute and value pair including the tag value.

The executable script of the active tag can include but is not limited to variables, variable assignments, conditional statements, loops, conditional loops, functions, operators, arithmetic operators, input functions, and output functions. The syntax used by the executable script of the active tag is preferably the syntax of a known programming scripting language. Known programming scripting languages include but are not limited to Visual Basic™ and Java™.

Data Sharing Among Autonomous Processing Entities

Figure 5:
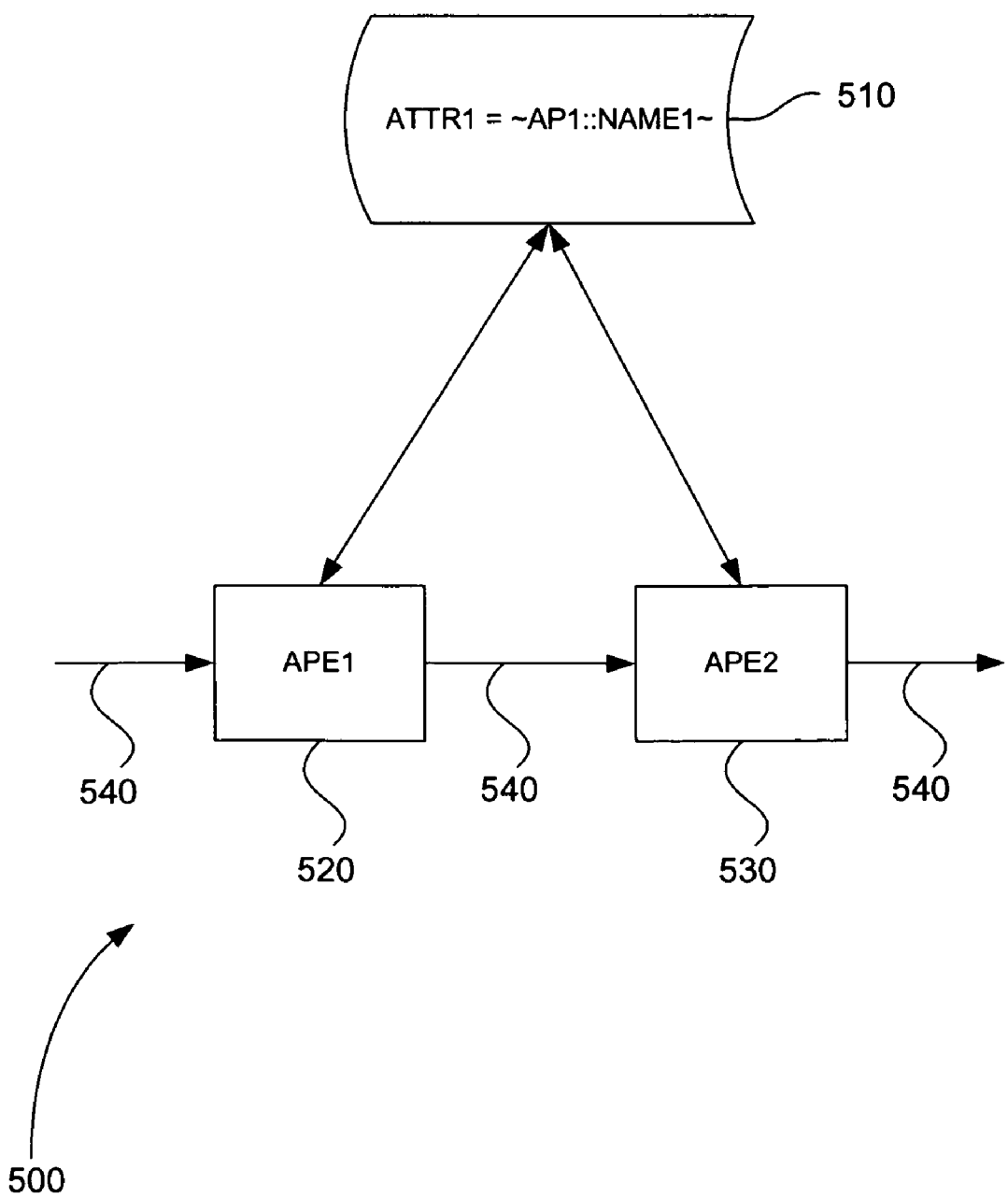
FIG. 5 is a schematic diagram showing an exemplary system for sharing information among autonomous processing entities that manipulate an instance of digital content, in accordance with an embodiment of the present invention.

FIG. 5 is a schematic diagram showing an exemplary system 500 for sharing information among autonomous processing entities (APEs) that manipulate an instance of digital content, in accordance with an embodiment of the present invention. APEs include but are not limited to software components that capture, process, and route digital data. The sources of the digital content include digital cameras, digital audio recorders, digital video recorders, digital audio players, digital video players, faxes, multifunctional peripherals, scanners, printers, computers, point of sale machines, automated teller machines, mail servers, address book managers, and databases. The types of digital content include digital images, digital audio recordings, a digital video recordings, binary files, and text files.

System 500 includes shared memory space 510 corresponding to the instance of digital content, first APE 520, and second APE 530. Shared memory space 510 can include but is not limited to a configuration file or a location in volatile memory. At least one attribute and value pair is placed in shared memory 510 to be read by second APE 530. Example attribute and value pair "ATTR1=~AP1::NAME1~" is shown in shared memory 510. The value of the at least one attribute and value pair is a tag, "~AP1::NAME1~", that includes an identifier identifying first APE 530, "AP1", and a tag name, "NAME1." The tag can include but is not limited to an RRT as shown in shared memory 510. First APE 520 is executed on the instance of digital content, produces a tag value corresponding to the tag name, searches the shared memory space for the tag by the identifier, replaces the tag with the tag value in shared memory 510, and terminates. Second APE 530 is executed on the instance of digital content after first APE 520 has terminated and reads the at least one attribute and value pair. The value of the at least one attribute and value pair includes the tag value. Arrows 540 show the order of execution of the APEs and depict the movement of the instance of digital content through system 500.

Another embodiment of system 500 utilizes active tags. At least one attribute and value pair is placed in shared memory 510 to be read by second APE 530. The value of the at least one attribute and value pair is an active tag that includes an identifier identifying first APE 520 and an executable script. The tag can include but is not limited to an active RRT. First APE 520 is executed on the instance of digital content, searches the shared memory space for the tag by the identifier, executes the executable script to produce a tag value, replaces the tag with the tag value in shared memory 510, and terminates. Second APE 530 is executed on the instance of digital content after first APE 520 has terminated and reads the at least one attribute and value pair. The value of the at least one attribute and value pair includes the tag value.

The executable script of the active tag can include but is not limited to variables, variable assignments, conditional statements, loops, conditional loops, functions, operators, arithmetic operators, input functions, and output functions. The syntax used by the executable script of the active tag is preferably the syntax of a known programming scripting language. Known programming scripting languages include but are not limited to Visual Basic™ and Java™.

Figure 6:
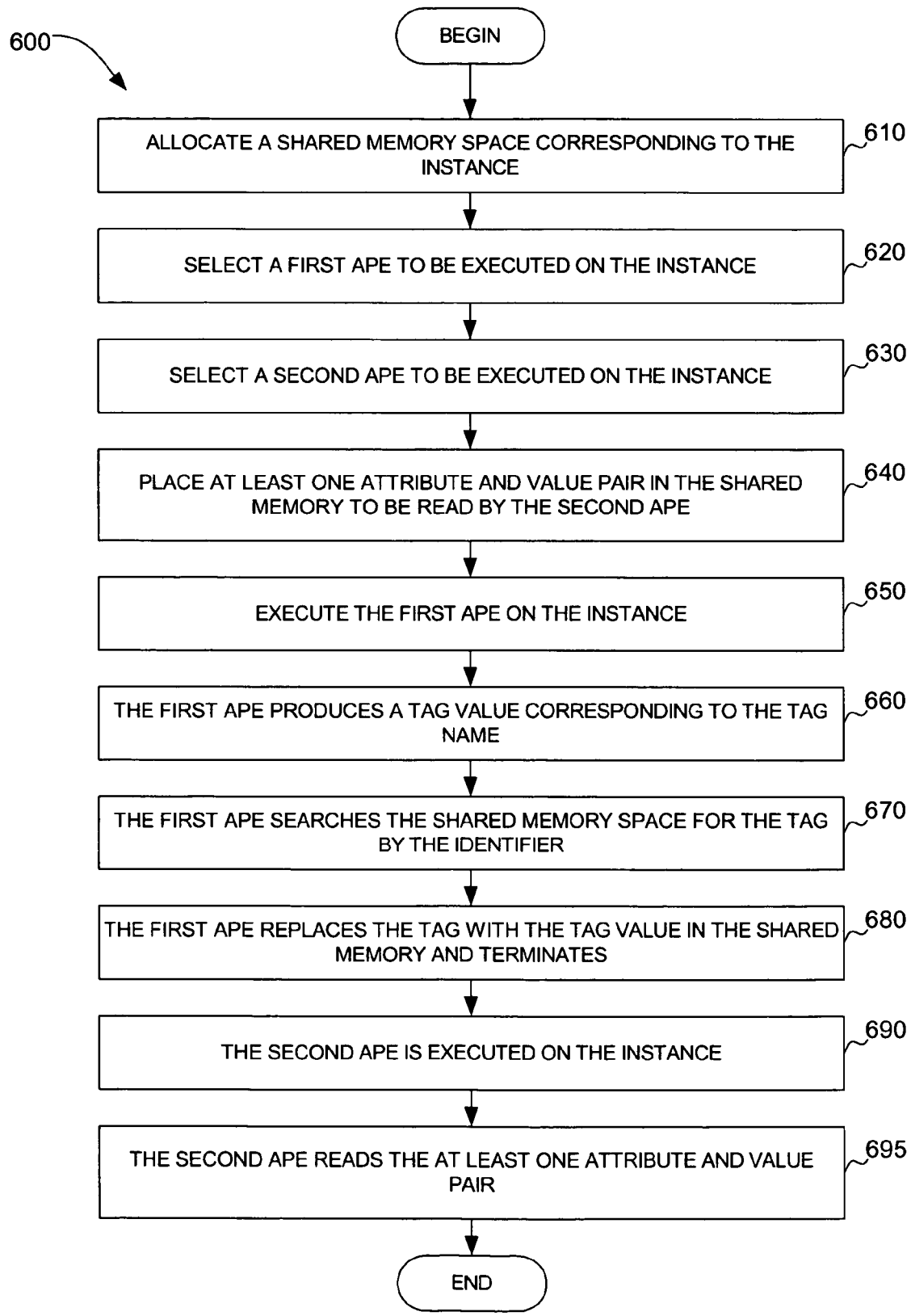
FIG. 6 is a flowchart showing an exemplary method for sharing information among autonomous processing entities that manipulate an instance of digital content, in accordance with an embodiment of the present invention.

FIG. 6 is a flowchart showing an exemplary method 600 for sharing information among APEs that manipulate an instance of digital content, in accordance with an embodiment of the present invention. APEs include but are not limited to software components that capture, process, and route digital data. The sources of the digital content include digital cameras, digital audio recorders, digital video recorders, digital audio players, digital video players, faxes, multifunctional peripherals, scanners, printers, computers, point of sale machines, automated teller machines, mail servers, address book managers, and databases. The types of digital content include digital images, digital audio recordings, a digital video recordings, binary files, and text files.

In step 610 of method 600, a shared memory space corresponding to the instance is allocated. The shared memory space can include but is not limited to a configuration file or a location in volatile memory.

In step 620, a first APE to be executed on the instance is selected.

In step 630, a second APE to be executed on the instance is selected. The second APE is executed sequentially after the first APE.

In step 640, at least one attribute and value pair is placed in the shared memory to be read by the second APE. The value of the at least one attribute and value pair is a tag including an identifier identifying the first APE and a tag name. The tag can include but is not limited to an RRT.

In step 650, the first APE is executed on the instance.

In step 660, the first APE produces a tag value corresponding to the tag name.

In step 670, the first APE searches the shared memory space for the tag by the identifier.

In step 680, the first APE replaces the tag with the tag value in the shared memory and terminates.

In step 690, the second APE is executed on the instance.

In step 695, the second APE reads the at least one attribute and value pair. The value of the at least one attribute and value pair includes the tag value.

In another embodiment of method 600, active tags are used. At least one attribute and value pair is placed in the shared memory to be read by the second APE, wherein the value is an active tag including an identifier identifying the first APE and an executable script. The first APE is executed on the instance. The first APE searches the shared memory space for the tag by the identifier. The first APE executes the executable script to produce a tag value. The first APE replaces the tag with the tag value in the shared memory and terminates. The second APE is executed on the instance. The second APE reads the at least one attribute and value pair. The value of the least one attribute and value pair includes the tag value.

The executable script of the active tag can include but is not limited to variables, variable assignments, conditional statements, loops, conditional loops, functions, operators, arithmetic operators, input functions, and output functions. The syntax used by the executable script of the active tag is preferably the syntax of a known programming scripting language. Known programming scripting languages include but are not limited to Visual Basic™ and Java™.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously improve the speed at which APEs can be made to share data. As long as a destination APE integrates into a framework that allows search and replacement of its parameters, little time is needed to integrate the destination APE with other APEs in the framework.

Another advantage of an embodiment of the present invention is that it allows standardization of "pushing" data elements available from a source APE. This is different from messaging definitions used within the industry. An exemplary messaging definition used within the industry is XML.

A third advantage of an embodiment of the present invention is that it provides an open framework in which all APEs can participate. Each APE can define and publish it's own RRTs without having to inform or integrate with others. As long as the destination APE's configuration parameters are open and available for search and replacement within a the framework, APEs can communicate and integrate.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for sharing data element values among software components of a document processing framework that capture, process, and route a digital image of a document, comprising:

a first software component of the document processing framework;

a second software component of the document processing framework;

a configuration file generated for the digital image, the configuration file having at least one data element attribute paired with a runtime replacement tag that the first software component replaces with a value for the data element attribute, wherein the runtime replacement tag comprises:

a start tag delimiter, an identifier for the first software component, a tag name, a separator that separates the identifier for the first software component from the tag name, and an end tag delimiter; and a processing device that executes the first software component and the second software component, wherein the processing device is configured to:

determine the first software component identified in the runtime replacement tag from the identifier in the runtime replacement tag;

execute the first software component on the digital image, wherein executing the first software component on the digital image causes the first software component to produce the value for the data element attribute and replace the runtime replacement tag with the value produced for the data element attribute;

terminate the first software component; and execute the second software component on the digital image in response to terminating the first software component, wherein executing the second software component on the digital image causes the second software component to read the value that replaced the runtime replacement tag in the configuration file.

2. The system of claim 1, wherein the start tag delimiter comprises a first tilde character, the separator that separates the identifier from the tag name comprises two consecutive colon characters, and the end tag delimiter comprises a second tilde character.

3. The system of claim 1, wherein the identifier for the first software component comprises three characters that identify the first software component.

4. The system of claim 1, wherein the tag name comprises one or more of a reserved replacement tag name, a field replacement tag name, or a special set replacement tag name.

5. The system of claim 1, wherein the runtime replacement tag comprises an active runtime replacement tag, and wherein the tag name comprises an executable script that the first software component executes to produce the value for the data element attribute.

6. The system of claim 5, wherein the executable script comprises one or more of variables, variable assignments, conditional statements, loops, conditional loops, functions, operators, arithmetic operators, input functions, or output functions.

7. The system of claim 5, wherein the executable script comprises one or more of Visual Basic™ syntax or Java™ syntax.

8. A method for sharing data element values among software components of a document processing framework that capture, process, and route a digital image of a document, comprising:
    generating a configuration file for the digital image, the configuration file having at least one at least one data element attribute paired with a runtime replacement tag that a first software component replaces with a value for the data element attribute, wherein the runtime replacement tag comprises:
        a start tag delimiter,
        an identifier for the first software component,
        a tag name,
        a separator that separates the identifier for the first software component from the tag name, and
        an end tag delimiter; and
    determining, by a processing device, the first software component identified in the runtime replacement tag from the identifier in the runtime replacement tag;
    executing, by the processing device, the first software component on the digital image, wherein executing the first software component on the digital image causes the first software component to produce the value for the data element attribute and replace the runtime replacement tag with the value produced for the data element attribute;
    terminating, by the processing device, the first software component;
    executing, by the processing device, a second software component on the digital image in response to terminating the first software component, wherein executing the second software component on the digital image causes the second software component to read the value that replaced the runtime replacement tag in the configuration file.

9. The method of claim 8, wherein the start tag delimiter comprises a first tilde character, the separator that separates the identifier from the tag name comprises two consecutive colon characters, and the end tag delimiter comprises a second tilde character.

10. The method of claim 8, wherein the identifier for the first software component comprises three characters that identify the first software component.

11. The method of claim 8, wherein the tag name comprises one or more of a reserved replacement tag name, a field replacement tag name, or a special set replacement tag name.

12. The method of claim 8, wherein the runtime replacement tag comprises an active runtime replacement tag, and wherein the tag name comprises an executable script that the first software component executes to produce the value for the data element attribute.

13. The method of claim 12, wherein the executable script comprises one or more of variables, variable assignments, conditional statements, loops, conditional loops, functions, operators, arithmetic operators, input functions, or output functions.

14. The method of claim 12, wherein the executable script comprises one or more of Visual Basic™ syntax or Java™ syntax.

15. A system for sharing information among autonomous processing entities that manipulate an instance of digital content, comprising:
    a shared memory space corresponding to the instance of digital content;
    a first autonomous processing entity; a second autonomous processing entity, wherein the shared memory space contains at least one data element attribute paired with a runtime replacement tag that the second autonomous processing entity reads from the shared memory space, wherein the runtime replacement tag comprises an identifier for the first autonomous processing entity and a tag name; and
    a processing device that executes the first autonomous processing entity and the second autonomous processing entity, wherein the processing device is configured to:
        determine the first autonomous processing entity identified in the runtime replacement tag from the identifier in the runtime replacement tag;
        execute the first autonomous processing entity on the instance of digital content, wherein executing the first autonomous processing entity on the instance of digital content causes the first autonomous processing entity to produce the value for the data element attribute and replace the runtime replacement tag with the value produced for the data element attribute; and
        execute the second autonomous processing entity on the instance of digital content in response to terminating the first autonomous processing entity, wherein executing the second autonomous processing entity on the instance of digital content causes the second autonomous processing entity to read the value that replaced the runtime replacement tag in the shared memory space.

16. The system of claim 15, wherein the instance of digital content comprises digital data created by one or more of a digital camera, a digital audio recorder, a digital video recorder, a digital audio player, a digital video player, a fax, a multifunctional peripheral, a scanner, a printer, a computer, a point of sale machine, an automated teller machine, a mail server, an address book manager, or a database.

17. The system of claim 15, wherein the instance of digital content comprises one or more of a digital image, a digital audio recording, a digital video recording, a binary file, or a text file.

18. The system of claim 15, wherein the shared memory space comprises one or more of a configuration file or a location in volatile memory.

19. The system of claim 15, wherein first autonomous processing entity comprises one or more of a capture software component, a processing software component, or a routing software component.

20. The system of claim 15, wherein second autonomous processing entity comprises one or more of a capture software component, a process software component, or a route software component.

21. The system of claim 15, wherein the runtime replacement tag has a format that comprises a first tilde character, followed by the identifier, followed by two consecutive colon characters, followed by the tag name, and ended with a second tilde character.

22. The system of claim 15, wherein the identifier for the first autonomous processing entity comprises three characters that identify the first autonomous processing entity.

23. The system of claim 15, wherein the tag name comprises one or more of a reserved replacement tag name, a field replacement tag name, or a special set replacement tag name.

24. The system of claim 15, wherein the runtime replacement tag comprises an active runtime replacement tag, and wherein the tag name comprises an executable script that the first autonomous processing entity executes to produce the value for the data element attribute.

25. The system of claim 24, wherein the executable script comprises one or more of variables, variable assignments, conditional statements, loops, conditional loops, functions, operators, arithmetic operators, input functions, or output functions.

26. The system of claim 24, wherein the executable script comprises one or more of Visual Basic™ syntax or Java™ syntax.

27. A method for sharing information among autonomous processing entities that manipulate an instance of digital content, comprising:
    allocating a shared memory space corresponding to the instance of digital content;
    selecting a first autonomous processing entity to be executed on the instance of digital content;
    selecting a second autonomous processing entity to be executed on the instance of digital content sequentially in response to the first autonomous processing entity terminating;
    placing at least one data element attribute paired with a runtime replacement tag in the shared memory space, wherein the second autonomous processing entity reads the at least one data element attribute paired with the runtime replacement tag from the shared memory space, and wherein the runtime replacement tag comprising an identifier for the first autonomous processing entity and a tag name;
    determining, by a processing device, the first autonomous processing entity identified in the runtime replacement tag from the identifier in the runtime replacement tag;
    executing, by the processing device, the first autonomous processing entity on the instance of digital content, wherein executing the first autonomous processing entity on the instance of digital content causes the first autonomous processing entity to produce the value for the data element attribute and replace the runtime replacement tag with the value produced for the data element attribute; and
    executing, by the processing device, the second autonomous processing entity on the instance of digital content in response to terminating the first autonomous processing entity, wherein executing the second autonomous processing entity on the instance of digital content causes the second autonomous processing entity to read the value that replaced the runtime replacement tag in the shared memory space.

28. The method of claim 27, wherein the instance of digital content comprises digital data created by one or more of a digital camera, a digital audio recorder, a digital video recorder, a digital audio player, a digital video player, a fax, a multifunctional peripheral, a scanner, a printer, a computer, a point of sale machine, an automated teller machine, a mail server, an address book manager, or a database.

29. The method of claim 27, wherein the instance of digital content comprises one or more of a digital image, a digital audio recording, a digital video recording, a binary file, or a text file.

30. The method of claim 27, wherein the shared memory space comprises one or more of a configuration file or a location in shared volatile memory.

31. The method of claim 27, wherein first autonomous processing entity comprises one or more of a capture software component, a processing software component, or a routing software component.

32. The method of claim 27, wherein second autonomous processing entity comprises one or more of a capture software component, a process software component, or a route software component.

33. The method of claim 31, wherein the capture software component comprises one or more of a digital sender reader, an address book manager exporter, an extensible markup language reader, a multifunctional peripheral interface, a poll directory software component, a content management queue software component, a batch importer, an email importer, or an application extractor.

34. The method of claim 31, wherein the process software component comprises one or more of an extensible markup language processing software component, an optical character recognition software component, an image management utility, an encryption or decryption software component, a barcode reader, a file utility, a notification software component, a database connectivity interface, a data interchange software component, a watermark creation software component, or a Visual Basic™ or Java™ scripting software component.

35. The method of claim 31, wherein the route software component comprises one or more of a fax software component, a directory software component, a printer software component, a portal or server interface, a content management software interface, a database connectivity interface, or a relational database interface.

36. The method of claim 32, wherein the capture software component comprises one or more of a digital sender reader, an address book manager exporter, an extensible markup language reader, a multifunctional peripheral interface, a poll directory software component, a content management queue software component, a batch importer, an email importer, or an application extractor.

37. The method of claim 32, wherein the process software component comprises one or more of an extensible markup language processing software component, an optical character recognition software component, an image management utility, an encryption or decryption software component, a barcode reader, a file utility, a notification software component, a database connectivity interface, a data interchange software component, a watermark creation software component, or a Visual Basic™ or Java™ scripting software component.

38. The method of claim 32, wherein the route software component comprises one or more of a fax software component, a directory software component, a printer software component, a portal or server interface, a content management software interface, a database connectivity interface, or a relational database interface.

39. The method of claim 27, wherein the runtime replacement tag has a format that comprises a first tilde character, followed by the identifier, followed by two consecutive colon characters, followed by the tag name, and ended with a second tilde character.

40. The method of claim 27, wherein the identifier for the first autonomous processing entity comprises three characters that identify the first autonomous processing entity.

41. The method of claim 27, wherein the tag name comprises one or more of a reserved replacement tag name, a field replacement tag name, or a special set replacement tag name.

42. The method of claim 27, wherein the runtime replacement tag comprises an active runtime replacement tag and wherein the tag name comprises an executable script that the first autonomous processing entity executes to produce the value for the data element attribute.

43. The method of claim 42, wherein the executable script comprises one or more of variables, variable assignments, conditional statements, loops, conditional loops, functions, operators, arithmetic operators, input functions, or output functions.

44. The method of claim 42, wherein the executable script comprises one or more of Visual Basic™ syntax or Java™ syntax.

45. A system for sharing data element values in a document processing framework, comprising:
   a first software component;
   a second software component;
   a configuration file generated for a digital object, the configuration file having at least one data element attribute paired with an active runtime replacement tag that the first software component replaces with a value for the data element attribute, wherein the active runtime replacement tag comprises an identifier for the first software component and an executable script; and
   a processing device that executes the first software component and the second software component, wherein the processing device is configured to:
      determine the first software component identified in the active runtime replacement tag from the identifier in the active runtime replacement tag;
      execute the first software component on the digital object, wherein executing the first software component on the digital object causes the first software component to execute the executable script in the active runtime replacement tag to produce the value for the data element attribute and replace the active runtime replacement tag with the value produced for the data element attribute; and
      execute the second software component on the digital object in response to the first software component terminating, wherein executing the second software component on the digital object causes the second software component to read the value that replaced the active runtime replacement tag in the configuration file.

46. A method for sharing data element values in a document processing framework, comprising:
   generating, by a processing device, a configuration file for a digital object, the configuration file having at least one data element attribute paired with an active runtime replacement tag, wherein the active runtime replacement tag comprises an identifier for a first software component and an executable script;
   executing, by the processing device, the first software component identified in the active runtime replacement tag on the digital object, wherein executing the first software component on the digital object causes the first software component to execute the executable script in the active runtime replacement tag to produce the value for the data element attribute and replace the active runtime replacement tag with the value produced for the data element attribute; and
   executing, by the processing device, a second software component on the digital object in response to the first software component terminating, wherein executing the second software component on the digital object causes the second software component to read the value that replaced the active runtime replacement tag in the configuration file.

* * * * *